United States Patent
Hambitzer et al.

(10) Patent No.: US 7,244,530 B2
(45) Date of Patent: Jul. 17, 2007

(54) RECHARGEABLE BATTERY CELL THAT IS OPERATED AT NORMAL TEMPERATURES

(75) Inventors: Gunther Hambitzer, Pfinztal (DE); Christiane Ripp, Pfinztal (DE); Ingo Stassen, Dresden (DE); Laurent Zinck, Mothern (FR); Franziska Jager, Pfinztal (DE)

(73) Assignee: Guenther Hambitzer, Pfinztal (DE)

( * ) Notice: Subject to any disclaimer, the term of this patent is extended or adjusted under 35 U.S.C. 154(b) by 537 days.

(21) Appl. No.: 10/480,489

(22) PCT Filed: Jun. 10, 2002

(86) PCT No.: PCT/DE02/02112

§ 371 (c)(1),
(2), (4) Date: Dec. 15, 2003

(87) PCT Pub. No.: WO02/103827

PCT Pub. Date: Dec. 27, 2002

(65) Prior Publication Data

US 2004/0157129 A1    Aug. 12, 2004

(30) Foreign Application Priority Data

Jun. 15, 2001 (DE) .............................. 101 28 970

(51) Int. Cl.
*H01M 4/66* (2006.01)
*H01M 10/36* (2006.01)

(52) U.S. Cl. ............................ 429/245; 29/2
(58) Field of Classification Search ................ 429/245, 429/346; 29/2
See application file for complete search history.

(56) References Cited

U.S. PATENT DOCUMENTS

| 4,037,032 A | 7/1977 | Nidola et al. |
|---|---|---|
| 4,096,318 A | 6/1978 | Wurmb et al. |
| 4,248,943 A | 2/1981 | Ludwig et al. |
| 4,513,067 A | 4/1985 | Kuo et al. |
| 4,567,031 A | 1/1986 | Riley |
| 4,892,796 A | 1/1990 | Chang et al. |
| 5,213,914 A | 5/1993 | Heitbaum et al. |
| 5,656,391 A | 8/1997 | Hambitzer et al. |
| 5,928,483 A | 7/1999 | Szpak et al. |

FOREIGN PATENT DOCUMENTS

| GB | 1491905 A1 | 11/1977 |
|---|---|---|
| WO | WO 89/05526 A1 | 6/1989 |
| WO | WO 00 79631 A1 | 12/2000 |
| WO | WO 02/071507 A2 | 9/2002 |

OTHER PUBLICATIONS

Bandopadhyay G., Ceramic-Coated Positive Current Collectors for Li-Al/LiCl-KCl/FeS$_2$ Batteries. In: *J Electrochem. Soc.*, Dec. 1981, vol. 128, No. 12, S.2545-2552.

*Primary Examiner*—Gregg Cantelmo
(74) *Attorney, Agent, or Firm*—Rothwell, Figg, Ernst and Manbeck

(57) ABSTRACT

Rechargeable battery cell operable at normal temperature, with an SO$_2$ based electrolyte system, a negative electrode and a positive electrode, wherein one of the electrodes has an electronically conductive discharge element. An improved cycle stability and consequently a longer useful lifetime is achieved in that, as a reaction protection material to protect the discharge element against unwanted reactions with constituents of the SO$_2$ based electrolyte system, at least a surface layer of the electronically conductive discharge element contains an alloy of chrome with another metal and/or a protective metal, selected from rhodium, tungsten, rhenium, tantalum, platinum, iridium, osmium or technetium in pure form, as an alloy or as a constituent of a compound and/or a carbide, nitride or phosphide of titanium, nickel, cobalt, molybdenum, iron, vanadium, zirconium or manganese.

22 Claims, 4 Drawing Sheets

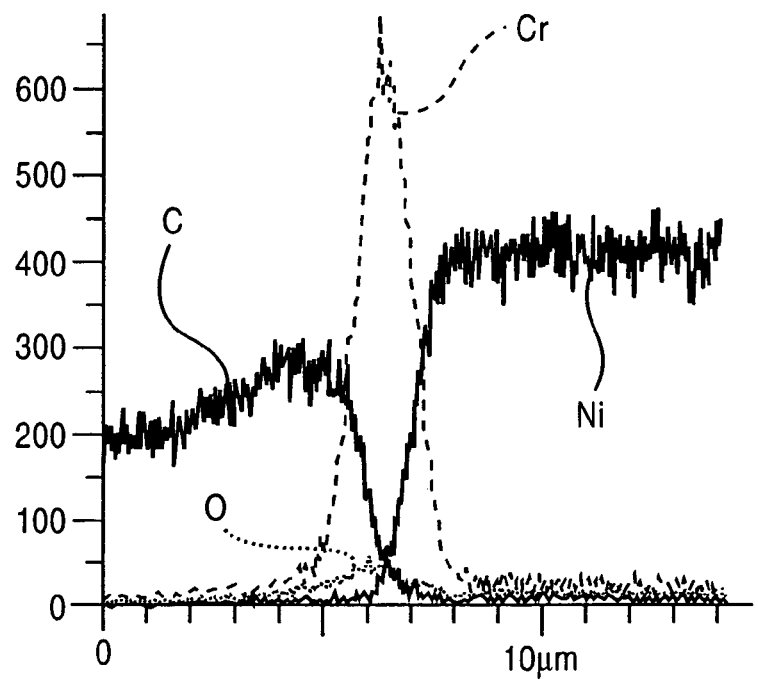
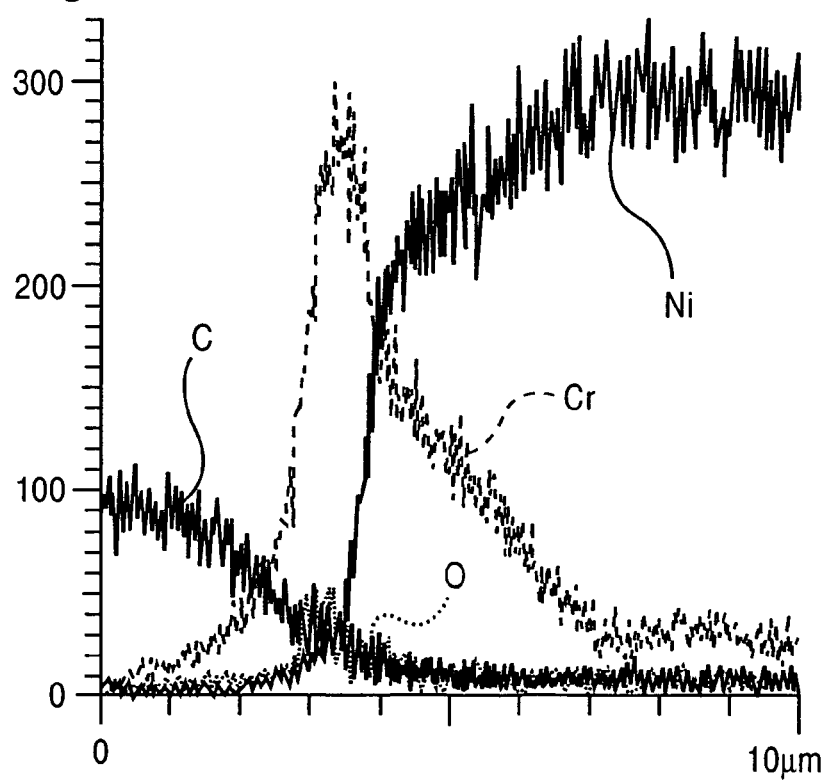

RECHARGEABLE BATTERY CELL THAT IS OPERATED AT NORMAL TEMPERATURES

CROSS REFERENCE TO RELATED APPLICATION

This application is a 35 USC § 371 National Phase Entry Application from PCT/DE02/02112, filed Jun. 10, 2002, and designating the U.S.

The invention relates to a rechargeable battery cell with an $SO_2$ based electrolyte system and operable at normal temperature.

The electrolyte systems of rechargeable battery cells usually contain a salt the ions of which carry the electrolytic charge (conducting salt) and a transport medium that ensures the necessary mobility of the ions of the conducting salt in the electrolyte system. The invention relates in particular to cells whose electrolyte system contains a conducting salt containing halogenide ions. Conducting salts containing chloride are especially common.

The transport medium which ensures the necessary mobility of the ions of the conducting salt in the electrolyte system is frequently organic (e.g. in the case of lithium-ion cells). The invention, however, relates specifically to cells with a sulfur dioxide based electrolyte system. The term "$SO_2$-based electrolyte systems" designates systems, in which the mobility of the ions of the conducting salt is ensured at least partially by the $SO_2$, so that $SO_2$ is an essential functional component of the transport medium of the electrolyte system. A special $SO_2$ electrolyte system which is also suitable for use with the present invention is described in German patent application 10110716.1, filed on Mar. 7, 2001, and the corresponding international patent application PCT/DE02/00789.

A fundamental problem with rechargeable batteries is their limited lifetime. Consequently, one of the key objectives of battery design is to develop batteries that remain operable for the largest possible number of charging and discharging cycles without significantly reducing their usable capacity. This property is usually termed cycle stability.

The capacity, and thus the usability, of rechargeable batteries degrades, however, not only as a result of repeated charging and discharging, but also when the battery is stored unused. This problem is particularly severe in the case of the lithium-ion cells which are nowadays in widespread use, e.g. in portable telephones and video cameras; their capacity is often exhausted after just one year. In addition to the capacity, the internal resistance of the cell is another operation parameter which degrades over the lifetime of the battery. Due to an increase in internal resistance the maximum extractable current is reduced. This means that when relatively low-resistance consumers are connected to the battery its voltage falls to impermissibly low levels.

The following possible factors causing these problems are discussed among those skilled in the art:

A loss of electrochemically active material on at least one of the battery electrodes resulting from mechanical changes to the material. In particular, when the batteries are in operation the active material may disintegrate into relatively small, mechanically unconnected particles which are lost from the surface of the electrode and thus are no longer available for the electrochemical process necessary for operation of the battery cell.

The electrical or electrochemical connection of parts of the active material to one of the electrode discharge elements may be lost.

The mechanical connection between the electrode discharge element and the active material may be lost, so that the active material falls off from the discharge element.

Porous materials comprised of particles have bridges between the particles which provide the necessary electrical contact between the particles. When using such batteries, changes may occur which increase the electrical resistance of these bridges and ultimately cause the electrical connection to be completely interrupted.

Finally, secondary reactions (in particular self-discharging or overcharging reactions) may occur in the cell, leading to the irreversible destruction of active material and consequently to a reduction in capacity and/or an increase in electrical resistance.

Based on these considerations, an object of the invention is to increase the useful lifetime of rechargeable battery cells with an $SO_2$ based electrolyte system.

The object is achieved by a battery cell in which a surface layer of an electronically conductive discharge element of at least one electrode contains, as a reaction protection material to protect the discharge element against unwanted reactions, an alloy of chrome with another metal and/or a protective metal, selected from the group comprising rhodium, tungsten, rhenium, tantalum, platinum, iridium, osmium and technetium in pure form, as a constituent of an alloy or as a constituent of a compound and/or a carbide, nitride or phosphide of titanium, nickel, cobalt, molybdenum, iron, vanadium, zirconium or manganese.

The term discharge element refers to the usually metallic constituent of the electrodes of battery cells that enables the necessary electronically conductive connection. The discharge element is in contact with an active material (which can be solid, gaseous or liquid) involved in the electrode reaction of the respective electrode. The electrode reaction involving the active material results in the formation or consumption of free electrons which are during discharging fed out (negative electrode) or fed in (positive electrode) by means of the discharge element.

Usually the discharge element is made from a metal (for example nickel, cobalt, copper, stainless steel or aluminum). Discharge elements made of carbon or conductive plastics are also used. Commonly used elements are in particular flat structures with a very large surface area relative to their thickness, wherein perforated structures (grills, perforated metal plates) and in particular highly porous materials, such as expanded metals or metal foam materials, are preferred.

Where the active material of the electrode is in the solid state, it is common to connect it directly to the discharge element to form a composite electrode. For example, particles of active material can be mixed with a suitable binding agent (e.g. polytetrafluorethylene) and connected to the discharge element by application of pressure (see U.S. Pat. No. 5,213,914). However, methods are also known in which the necessary connection of the active material with the discharge element is established without using organic binding agents (see U.S. Pat. No. 5,656,391).

In the course of the invention it was found that the useful lifetime of battery cells with an $SO_2$ based electrolyte system is significantly improved if (at least) a surface layer of the discharge element contains a reaction protection material by which unwanted reactions of the constituents of the discharge element with constituents of the electrolyte system, and under certain circumstances also with constituents of the active material of the electrode concerned, are prevented. This applies in particular to electrolyte systems with conducting salts containing chloride. Such systems are well suited for various rechargeable cells but have the disadvantage that the halogenide ions react with the metal of the discharge element to form compounds (e.g. metal chlorides) which, when formed on the surface of the discharge element, lead to a reduction in capacity and/or an increase in (internal resistance of the cell.

In that respect, the invention in part follows on from a proposal already published in 1990 in U.S. Pat. No. 4,892,796, in which an alkali metal cell with an $SO_2$ based electrolyte and a $CuCl_2$ cathode is described. The discharge element of the cathode, termed "current collector" in said patent, contains a chrome foil plated onto a nickel core. The chrome foil is preferably applied to the nickel core by means of hard-chrome plating with a thickness of 2.5 µm to 50 µm (0.1 to 2 mil). The object of this is to deactivate the surface of the current collector. It is reported that the battery capacity of the cells remains largely stable over a large number of charging and discharging cycles if the discharge element of the cathode is coated with the chrome foil.

In experimental testing of the present invention it was confirmed that the lifetime of battery cells with an $SO_2$ based electrolyte depends to a very substantial degree on the protection of the electrode discharge element against unwanted reactions. The protection provided by the method described in U.S. Pat. No. 4,892,796 is, however, inadequate. According to the invention, therefore, it is suggested that at least one of the following reaction protection materials be used in a surface layer of the electronically conductive discharge element:

A) An alloy of chrome with another metal.
  In the method described in U.S. Pat. No. 4,892,796 the chrome foil is applied as a discrete layer to the nickel base, thereby creating a distinct phase boundary. In contrast, according to the invention, a manufacturing method is used in which an alloy of chrome and another metal, in particular nickel, is formed in the surface layer. This is preferably achieved by diffusion of chrome atoms from the surface toward the inside of the discharge element. This creates a chrome diffusion layer, within which the concentration of the chrome decreases in the direction away from the surface.
  Particularly good results are obtained when the chrome diffusion layer is covered by a very thin layer of pure chrome. Contrary to U.S. Pat. No. 4,892,796, this additional chrome layer is not a relatively thick layer of hard chrome, but a very thin layer of chrome ("decorative plate") less than 5 µm thick, preferably no more than 2.5 µm thick and most preferably no more than 1 µm thick.
B) A protective metal, selected from rhodium, tungsten, rhenium, tantalum, platinum, iridium, osmium or technetium in pure form, as a constituent of an alloy or as a constituent of a compound.
A carbide, nitride or phosphide of titanium, nickel, cobalt, molybdenum, iron, vanadium, zirconium or manganese.
  These three types—A, B, C—of reaction protection materials can also be combined.

The above description indicates that the term "surface layer" does not have to be understood as referring in a restrictive manner to a discrete layer with a homogeneous composition. Rather, the term describes the range of the discharge element close to the surface which is decisive in determining its reactive behavior (in particular with regard to reactions with the electrolyte) and in which at least one of the reaction protection materials listed above must be localized in order to achieve the desired protective effect.

If in the case of type A) an additional thin layer of pure chrome is present, the surface layer in the sense of the above definition is formed by the combination of two layers, namely the chrome alloy layer (in particular chrome diffusion layer) and the chrome layer covering it.

Using the measures of the invention a significant improvement in the useable lifetime of the battery cells is achieved.

The invention is of special significance for cells which during charging reach very high cell voltages (above 4 Volts). This applies in particular to lithium cells. In this kind of cells overcharging reactions can occur at relatively high charging voltages which are very advantageous for the operation of the cell. This is described in more detail in the international patent application WO 00/79631 A1. The high cell voltages above 5 Volts associated with such advantageous overcharging reactions cause, however, according to the findings of the inventors reaction conditions with regard to the discharge element of the positive electrode which (because of the formation of reactive chlorine for example) are particularly problematic. The present invention allows to charge these cells in the mentioned high potential range without reducing their lifetime. It is therefore applicable in particular in conjunction with the battery cell described in WO 00/79631 A1. The content of that document is incorporated herein by reference.

A further advantage of the invention, in particular when using a protective material of type A, is an improved mechanical stability (especially in comparison with U.S. Pat. No. 4,892,796).

The invention relates in particular to cells having a negative electrode which in the charged state contains an active metal A selected from the group comprising the alkali metals, the alkaline earth metals and the metals of the second subgroup of the periodic system. Preferred active metals are lithium, sodium, calcium and zinc. Alkali metal cells, in particular with sodium and especially preferably lithium as active metal, are characterized by highly advantageous properties for practical use, above all a low weight and—in conjunction with commonly used suitable positive electrodes—a high cell voltage (and thus a very high energy density). The high cell voltage does, however, lead to the mentioned special corrosion problems.

In order to achieve the protective effect according to the invention it is sufficient if the reaction protection material is present in a surface layer of the discharge element. The interior of the discharge element may be of a different material, designated in the following as the core material. Materials based on nickel, copper, stainless steel, aluminum or carbon are suitable, for example. A relatively thin surface layer is sufficient, preferably enclosing the entire surface of the discharge element which is in contact with the electrolyte system. It should preferably be designed so as to be impervious to the constituents of the electrolyte system (in particular halogenide ions). Experimental findings indicate that a small number of atomic layers are sufficient, depending on the reaction protection material used, so that a layer thickness of the reaction protection material of 0.5 nm on the surface may be adequate. Usually, however, a somewhat greater layer thickness of at least 10 nm, preferably at least 100 nm and especially preferably at least 0.5 µm, is advantageous.

The protective metals (reaction protection material type B) may, as mentioned, be contained in the surface layer in pure form, as a constituent of an alloy or as a constituent of a compound. In the case of an alloy, both alloys of only the protective metals and alloys of the protective metals with other metals are suitable. A particularly advantageous protective effect was observed in the case of a surface layer containing an oxide of one of the mentioned protective metals. Other compounds including carbides, nitrides and phosphides of the protective metals can also be used as well as compounds of the reaction protection material type C. In many cases it is advantageous if the surface layer consists entirely of one or a plurality of the reaction protection materials of types B and C. In any case, however, the content of these types of reaction protection material should be greater than 20 Mol %.

The choice of a suitable manufacturing method depends on the choice of reaction protection material. If a reaction protection material can be applied by galvanic deposition, this method is suitable for the invention. The chrome used for the reaction protection material of type A can be effectively applied by common chrome electroplating methods, as used for other purposes, onto a discharge element the interior of which contains a different metal, in particular nickel. Electroplating of rhodium and platinum is also possible, though those materials are less preferred at present because of their high price.

Some of the reaction protection materials cited cannot be deposited as a thin surface layer onto a core material, or can only be applied with very substantial effort and expense, because of their high melting points or for other reasons. Such materials are preferably used in structures in which the discharge element in its entirety (that is, not just its surface layer) consists of a single material (for example one of the protective metals). In many cases, however, thin layers can also be produced with such materials, in particular protective metals of type B, by means of deposition from the gas phase (for example by sputtering). A surface layer with a reaction protection material of type A, too, can be advantageously produced in this way.

Surprisingly, experimental testing of the invention has shown that particularly good results are achieved if the manufacturing method includes a step in which a flat discharge element material, already containing chrome or one of the protective metals of type B at least on its surface, is additionally tempered, preferably in an inert or reducing gas atmosphere.

This was tested, for example, with a discharge element based on a nickel foam material (RETEC® manufactured by RPM Ventures L.L.C.) onto which chrome was electroplated in a decorative plate process. This discharge element material was slowly heated over several hours in a moderately reducing protective gas atmosphere (mixture of argon and hydrogen) to 800° C. and maintained at that temperature for approximately one hour. This resulted in a greenish discoloration of the surface, indicating the formation of chrome oxide.

The use of a discharge element with such a protective layer with additional thermal treatment result in a further improvement in long-term stability. According to the findings of the inventors, this is mainly due to the fact that tempering causes chrome atoms to diffuse away from the surface toward the inside of the discharge element, thereby creating a diffusion layer with a concentration gradient decreasing in the direction away from the surface. As mentioned, it was surprisingly found that such a chrome diffusion layer provides particularly good protection against unwanted reactions.

A chrome diffusion layer can also be produced by other means, e.g. by deposition of chrome by a process which involves heating of the surface of the discharge element material such as sputtering. In such a process, the chrome atoms diffuse into the surface without a need for additional tempering.

The described formation of the oxide of the protective metal in a reducing atmosphere can probably be explained by an conversion of nickel oxide on the surface of the nickel material with the chrome (by reduction to metallic nickel) to form chrome oxide. It is particularly surprising that the formation of a metal oxide layer which, in pure form, is less conductive than the pure metal does not degrade but rather helps to enhance the properties of the discharge element.

The desired reaction protection can also be achieved by tempering an alloy containing one of the mentioned metals at an elevated temperature in such a manner that the concentration of the metal on the surface is increased by the heat treatment process to such an extent that an adequate protective effect is achieved. This was tested, for example, with a nickel-chrome alloy containing 20% chrome which was tempered at 800° C. for 1 hour. In this heat treatment process a solid state diffusion takes place, resulting in an enrichment of chrome atoms at the surface, thus producing a concentration gradient of the chrome.

In addition to these methods, other methods are also suitable for the invention in order to produce a protective layer on the surface of a discharge element. For example, a metal composite can be produced by mechanical means. It is in principle also possible to use a surface layer containing a reaction protection material together with an organic or inorganic binding agent and to join such a layer by means of the binding agent to the core material in such a way that a protective layer with the properties required in accordance with the present invention is formed.

The discharge element with the surface layer containing the reaction protection material is preferably used for the positive electrode of the cell, because according to the observations of the inventors the risk of disturbing surface reactions is particularly high there, due to the electrochemical conditions prevailing on the positive electrode. It may, however, also be beneficial to provide the discharge element of the negative electrode with a surface layer containing one of the cited reaction protection materials. It was observed, for example, that in batteries comprising a plurality of cells, if the cells are charged together in a series configuration, operating states can occur in which a disturbing surface reaction takes place at the discharge element of the negative electrode similar to those otherwise occurring primarily on the positive electrode.

The invention is of particular importance in the case of cells where the positive electrode is a composite electrode, wherein—as described above—the discharge element forms a substrate for an active material permanently joined to it. This applies in particular to cells in which the active material contains a metal oxide or a metal halogenide. A special preference is for an intercalation compound comprising an alkali metal (as the active metal A of the cell), a transition metal M with the atomic number 22 to 28 and oxygen. The alkali metal is preferably lithium. Among the metals M, cobalt and nickel are especially preferred. Of particular practical significance are also binary and ternary metal oxide intercalation compounds containing two or three different transition metals in the lattice structure, such as lithium-nickel-cobalt oxide (see U.S. Pat. No. 4,567,031). Where "a" transition metal is mentioned here as a constituent of the intercalation compound, this does not of course mean that the compound contains only one single transition metal.

Hereafter the invention is presented in more detail with reference to the figures:

FIG. 7 shows an EDX line scan of a surface cross-section of a discharge element with a chrome electroplating;

FIG. 8 shows an EDX line scan of a surface cross-section of a discharge element with a chrome diffusion layer.

The effect of the invention was examined with the aid of cyclic voltamograms. A three-electrode arrangement with lithium as the reference electrode and counter-electrode and the discharge element under examination as the working electrode was used. The cell under examination was charged with an electrolyte system containing $LiAlCl_4$ as the conducting salt and $SO_2$ as the transport medium (at a ratio of 1:1.5). The potential was varied between 3.5 Volts and 5.5 Volts vs. $Li/Li^+$ with a potential advance rate of 20 mV/s.

Figure 1:
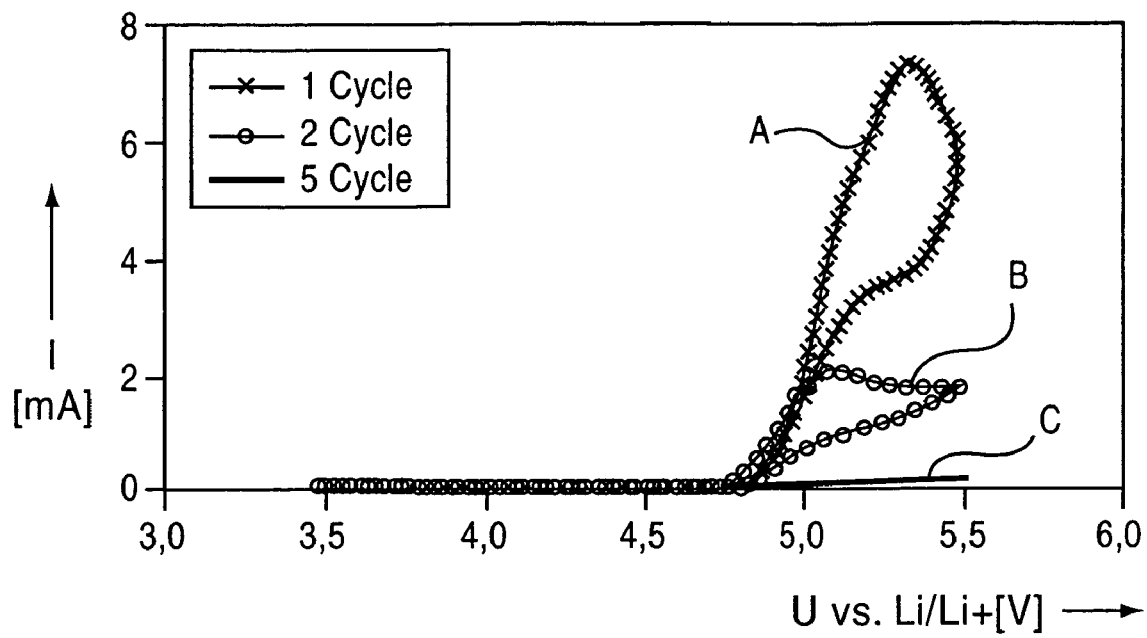
FIG. 1 shows a cyclic voltamogram when using a discharge element of untreated nickel.

FIG. 1 shows a cyclic voltamogram when using a discharge element of untreated nickel. Curve A shows the first cycle, in which a current caused by a reaction on the surface of the discharge element flows above about 5 Volts. Already in the second cycle, designated B, the current flow is significantly lower because on the surface of the discharge element a disturbing reaction has occurred (according to the findings of the inventors primarily a formation of nickel chloride). The surface layer thereby created prevents the desired overcharging reaction. Curve C shows the fifth cycle, in which practically no more current is flowing.

Figure 2:
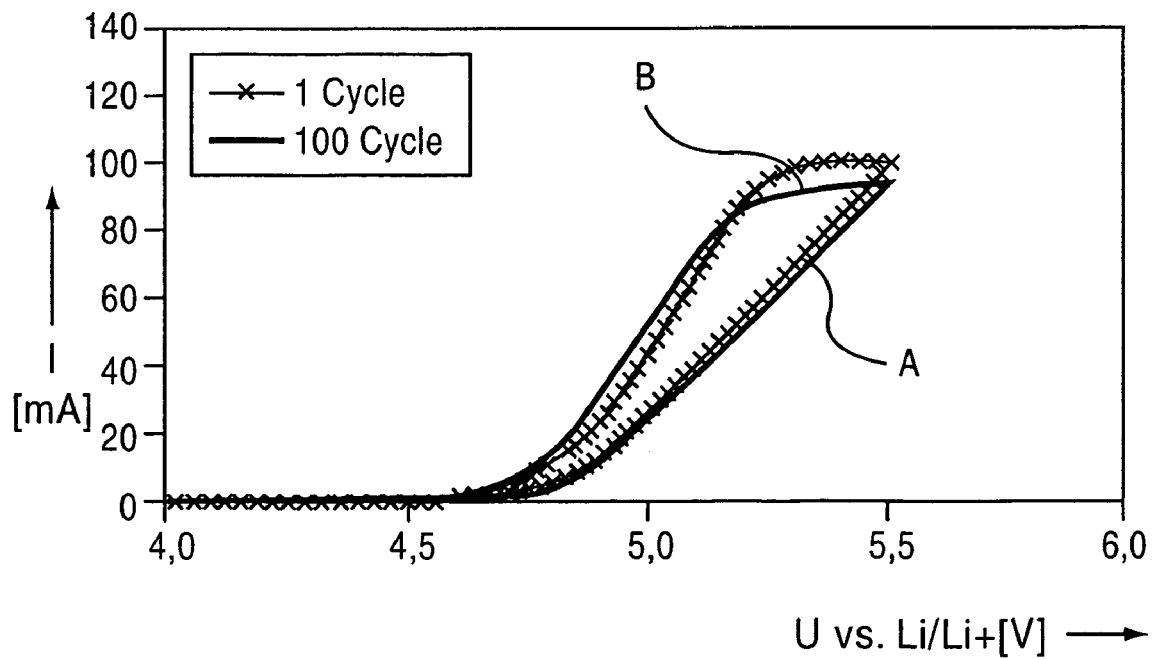
FIG. 2 shows a cyclic voltamogram when using a discharge element having a surface layer containing rhodium.

FIG. 2 shows a cyclic voltamogram with a discharge element based on a nickel sheet material electroplated with a protective layer of rhodium of about 2 μm thickness. The thick curve A is the voltamogram of the first cycle; the thin curve B is the voltamogram of the hundredth cycle. It can be clearly seen that both cycles are practically the same. From this result it can be derived that the desired overcharging reaction takes place in a practically unchanged manner even after several hundred cycles.

Figure 3:
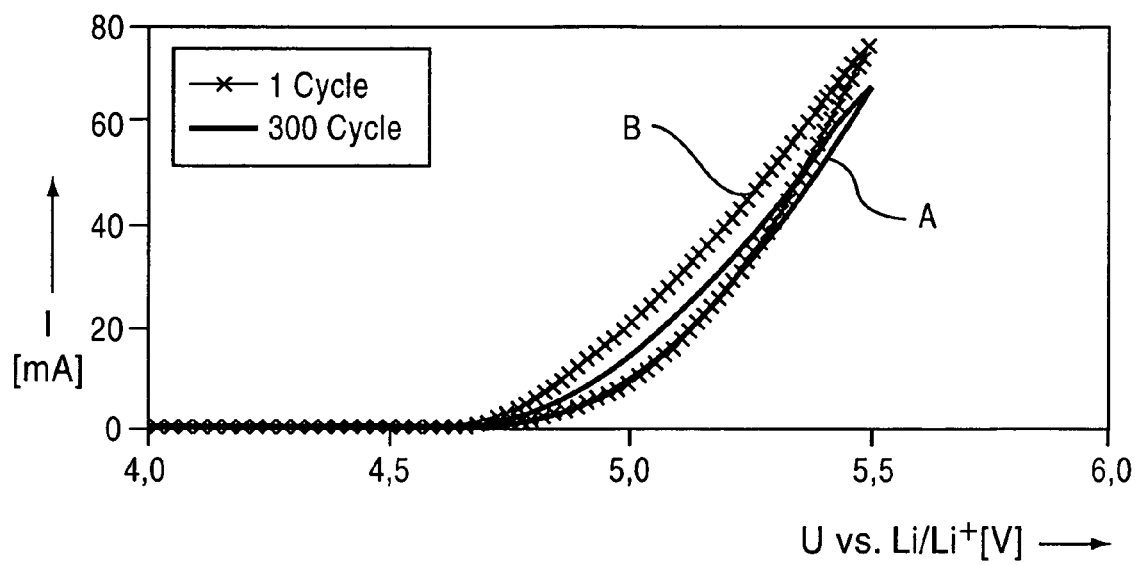
FIG. 3 shows a cyclic voltamogram when using a discharge element with a chrome diffusion layer.

FIG. 3 shows corresponding results for a discharge element based on a nickel sheet material onto which as a first step chrome was electroplated to a thickness of approximately 0.5 μm (decorative chrome plating). Then the discharge element was heated in protective gas with moderately reducing properties (argon/hydrogen) within approximately six hours to 800° C., held at that temperature for one hour and then cooled. The figure shows the first cycle (thin line A) and the three hundredth cycle (thick line B). Here, too, a virtually complete coincidence of the curves shows that the surface properties of the discharge element have remained practically unchanged over the three hundred cycles.

Figure 4:
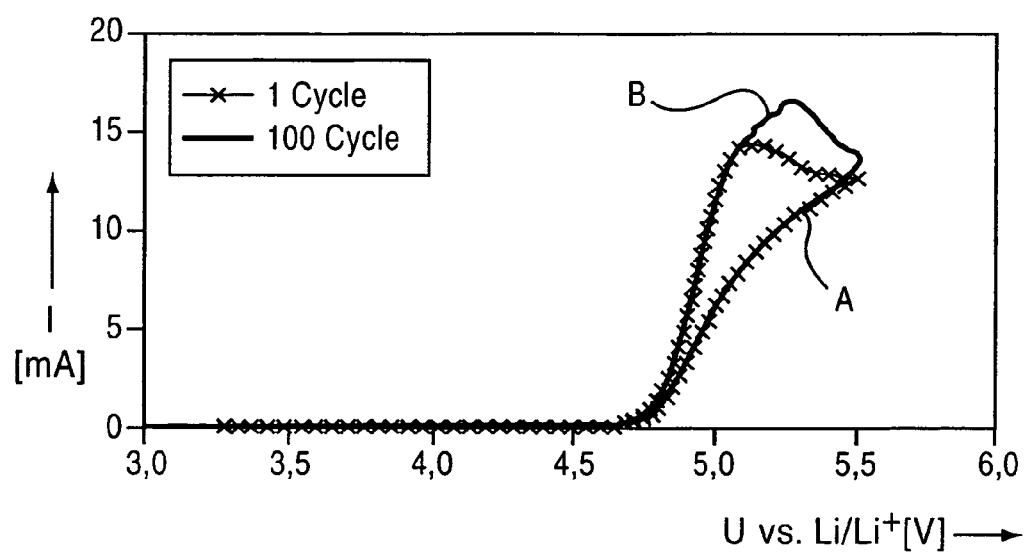
FIG. 4 shows a cyclic voltamogram when using a discharge element of tungsten.

FIG. 4 shows a corresponding test result for a discharge element comprising in its entirety a single material—in the case shown, solid tungsten. The voltamogram of the first cycle is shown as the thick curve A; the hundredth cycle is shown as the thin curve B. The result shows that discharge elements made from homogeneous metals, such as tungsten, the electrochemical properties of which remain stable, can be used. In this case the reaction current not only does not decrease after more than a hundred cycles, it even increases.

Figure 5:
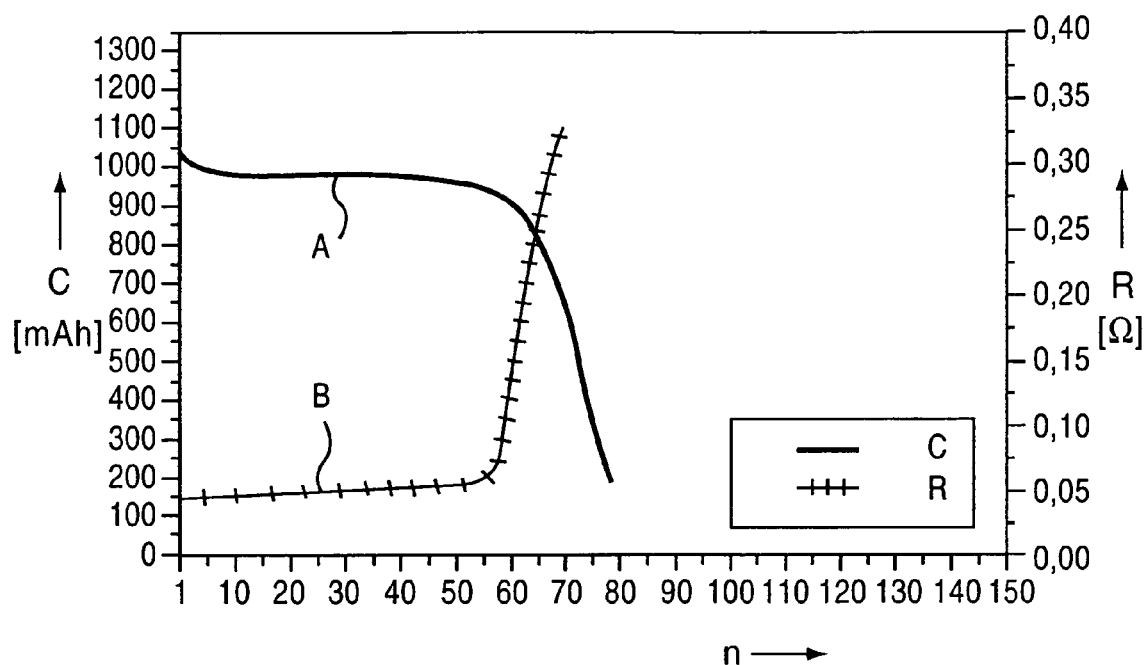
FIG. 5 shows the change of the discharge capacity and of the internal resistance as a function of the number of charging and discharging cycles in the case of a cell based on the prior art.
Figure 6:
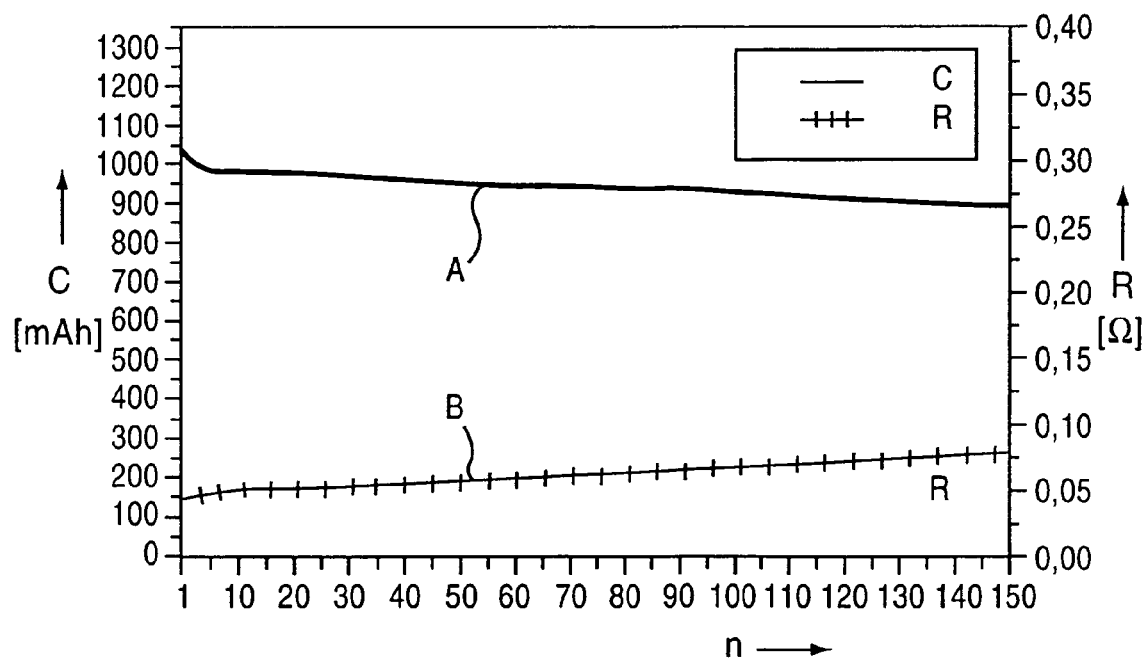
FIG. 6 shows the change of the discharge capacity and of the internal resistance as a function of the number of charging and discharging cycles in the case of a cell according to the invention.

FIGS. 5 and 6 show the typical characteristic of the discharge capacity C (curve A in each case) and of the internal resistance R (curve B in each case) as a function of the number n of charging and discharging cycles. FIG. 5 shows that in the case of cells based on the prior art the capacity initially remains largely stable, but then rapidly falls to values at which the cell is practically no longer operable. The resistance rises to a correspondingly high level. The reason for this rapid decline in the cell characteristics is that the increase in resistance results in an increase in the required charging voltage, which in turn results in an increase in disturbing surface reactions of the discharge element. FIG. 6 shows that this effect does not occur in the case of a cell based on the invention. Both the capacity and the internal resistance remain largely stable over a large number of cycles.

The EDX line scans in FIGS. 7 and 8 show the distribution of chrome (Cr) and nickel (Ni) metals and of oxygen atoms (O) contained in the surface layer of a discharge element. The concentrations are plotted in arbitrary units as a function of the depth underneath the surface in μm, the zero point of the abscissa being chosen arbitrarily. The carbon concentration (C) also shown is due to epoxy resin used to embed the tested precision cut sample.

FIG. 7 shows that chrome electroplating produces a discrete chrome layer which is practically completely separated from the nickel base material. The minor overlap of the curves results from the limited depth resolution of the test method (spot width approximately 1 μm). Observing the cross-section in the scanning electron microscope shows that the electroplated chrome decorative plate is not crack-free, but exhibits cracks that extend down to the nickel base material.

FIG. 8 shows the corresponding results after the material has been tempered (as described in connection with FIG. 3). The result is a several μm wide transition zone in which the concentration of the chrome gradually decreases away from the surface and the concentration of the nickel increases correspondingly. Under the scanning electron microscope it can be seen that the layer thickness of the chrome has significantly decreased because of the material diffusion into the chrome diffusion layer. The cracks, however, are substantially closed.

In summary, the presented experimental results demonstrate that with a chrome decorative plate, as previously used only for decorative purposes, an outstanding improvement in the quality of electrochemical cells can be achieved if a chrome diffusion layer is produced in the surface layer of the discharge element. The surface layer required for effective protection against unwanted reactions is only a few μm thick. The invention can thus also be used in a particularly advantageous way for the discharge elements mentioned above comprising highly porous materials such as expanded metals and, in particular, metal foams. Here the reaction protection surface layer protects not only the outer surface but the entire inner surface of the porous material.

The invention claimed is:

1. A rechargeable battery cell with
   an $SO_2$-based electrolyte system,
   a negative electrode and a positive electrode
   wherein one of the electrodes has an electronically conductive discharge element containing in a surface layer thereof a reaction protection material wherein
the reaction protection material comprises
an alloy of chrome with another metal and/or
a protective metal, selected from the group comprising rhodium, tungsten, rhenium, tantalum, platinum, iridium, osmium or technetium in pure form, as a constituent of an alloy or as a constituent of a compound and/or
a carbide, nitride or phosphide of titanium, nickel, cobalt, molybdenum, iron, vanadium, zirconium or manganese.

2. The battery cell of claim 1, wherein the surface layer contains, as a reaction protection material, an alloy of chrome with another metal in the form of a chrome diffusion layer, within which the concentration of the chrome decreases in the direction away from the surface.

3. The battery cell of claim 2, wherein the surface layer includes a chrome layer covering the chrome diffusion layer.

4. The battery cell of claim 1, wherein the surface layer contains an alloy of the chrome with nickel.

5. The battery cell of claim 1, wherein the surface layer contains an oxide of the chrome.

6. The battery cell, of claim 1 wherein the discharge element contains, under the surface layer, a core material different from the material of the surface layer.

7. The battery cell of claim 6, wherein the core material contains nickel, copper, aluminum, stainless steel or carbon.

8. The battery cell of claim 1, wherein at least one component of the surface layer is applied by deposition from a gas phase.

9. The battery cell of claim 1, wherein at least one component of the surface layer is applied by electrodeposition.

10. The battery cell of claim 9, wherein the component applied by electrodeposition is chrome.

11. The battery cell wherein the discharge element is a constituent of a composite electrode in which the discharge element serves as a substrate for an active material permanently joined thereto.

12. The battery cell of claim 11, wherein the composite electrode is the positive electrode of the cell.

13. The battery cell of claim 12, wherein an active material of the positive electrode is a metal oxide or a metal halogenide.

14. The battery cell of claim 12, wherein the negative electrode when charged contains an active metal selected from the group comprising the alkali metals, the alkaline earth metals and the metals of the second subgroup of the periodic system.

15. The battery cell of claim 14, wherein the active metal is lithium, sodium, calcium or zinc.

16. The battery cell of claim 15, wherein the metal oxide is an intercalation compound.

17. The battery cell of claim 1, wherein the electrolyte system contains halogenide ions.

18. Method for manufacturing a battery cell of claim 1, wherein the method includes a step in which a flat discharge element material containing, at least at its surface, a metal selected from the group comprising chrome, rhodium, tungsten, rhenium, tantalum, platinum, iridium, osmium or technetium, is tempered.

19. The method of claim 18, wherein the temperature and duration of the tempering are selected such that atoms of the metal diffuse away from the surface into the adjacent material of the discharge element, so that a diffusion layer is created within which the concentration of the metal decreases in the direction away from the surface.

20. The method of claim 19, wherein the metal is chrome.

21. The method of claim 20, wherein the material into which the chrome is diffused is nickel.

22. The method of claim 18, wherein the tempering process takes place in an inert or reducing gas atmosphere.

* * * * *